Patented Feb. 5, 1929.

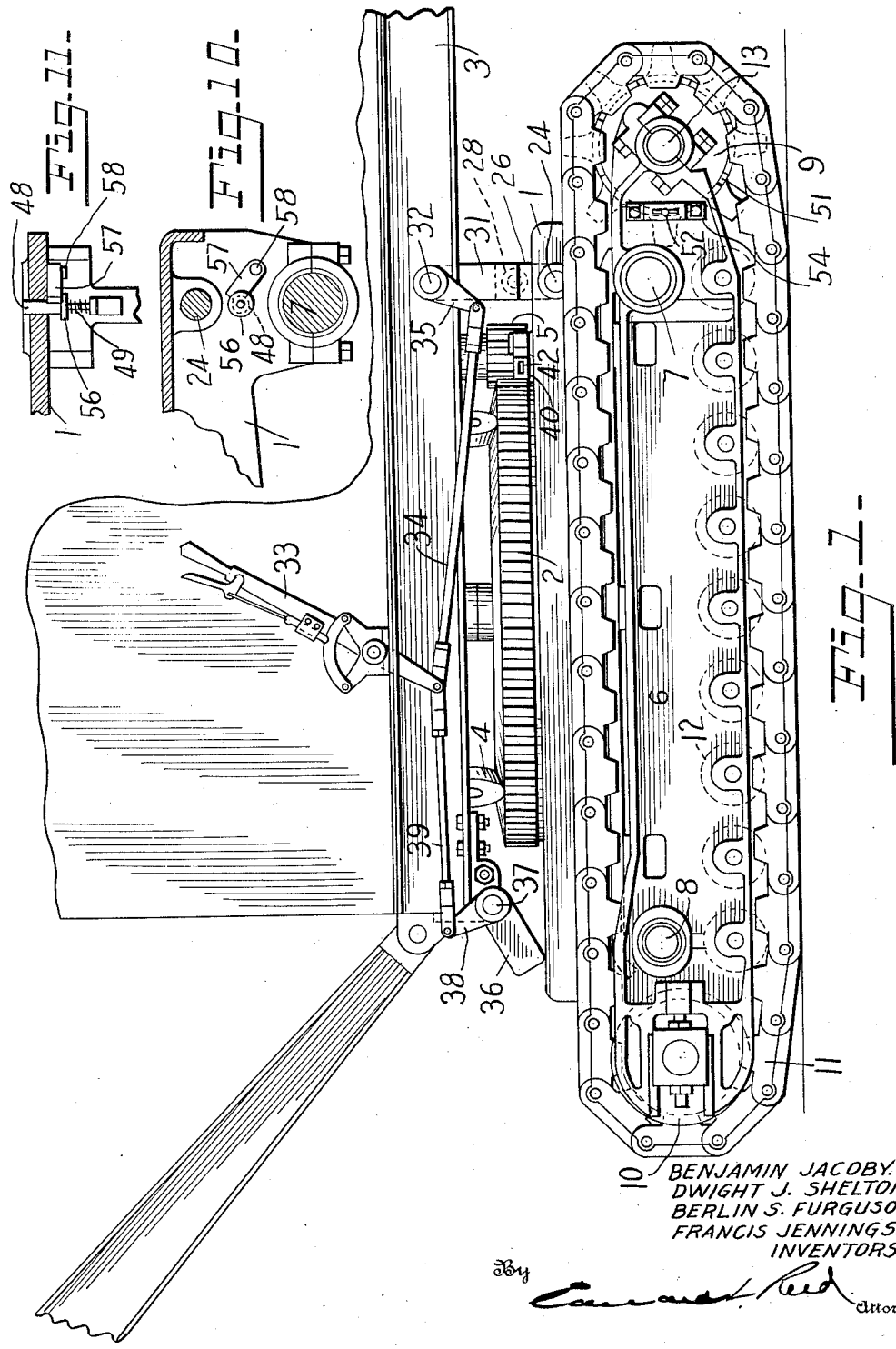

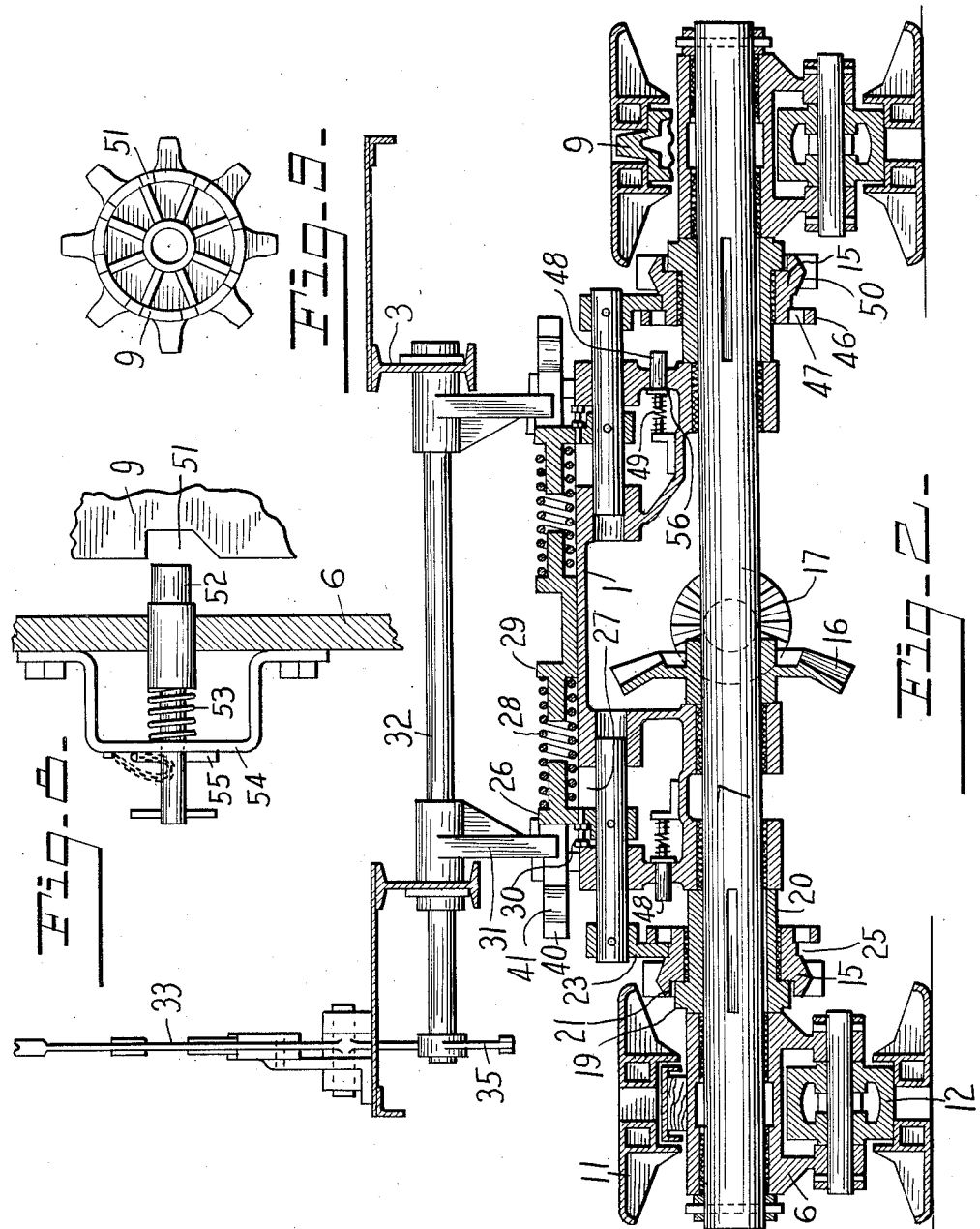

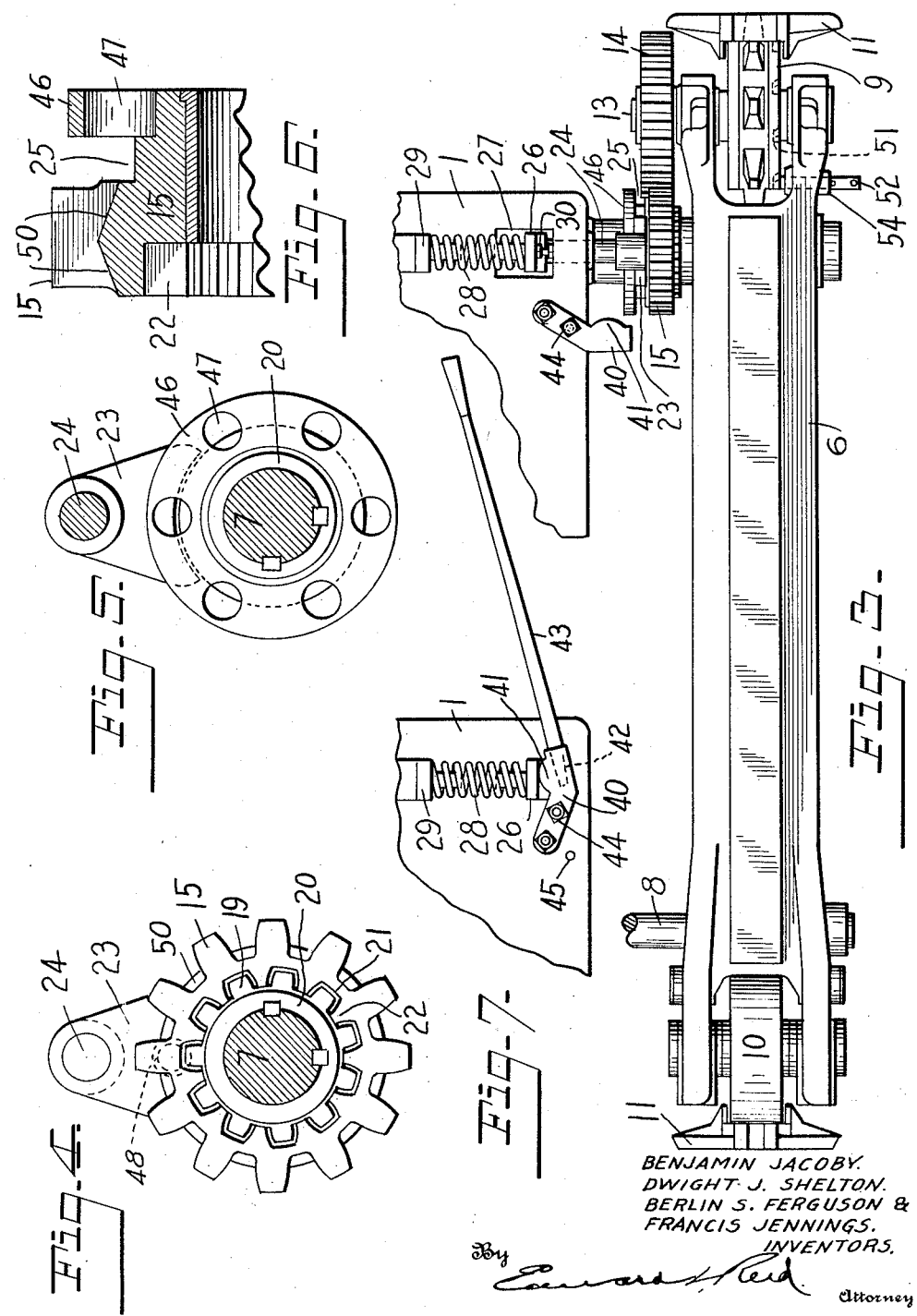

1,701,006

UNITED STATES PATENT OFFICE.

BENJAMIN JACOBY, DWIGHT J. SHELTON, BERLIN S. FERGUSON, AND FRANCIS JENNINGS, OF MARION, OHIO, ASSIGNORS TO THE MARION STEAM SHOVEL COMPANY, OF MARION, OHIO, A CORPORATION OF OHIO.

STEERING MECHANISM FOR CRAWLING TRACTION DEVICES.

Application filed July 27, 1922. Serial No. 577,841.

This invention relates to a steering mechanism for crawling traction devices.

Crawling traction devices are usually steered by retarding or stopping the movement of one device while the movement of the other device continues. This is easily accomplished where the operator's platform occupies a fixed position with relation to the traction devices, but where the platform is revoluble, as in the case of revolving steam shovels and the like, it is a much more difficult matter to provide steering connections between the driving mechanism and the traction devices. In most cases where crawling traction devices have been applied to machines having revolving platforms, no attempt is made to control the steering connections between the driving mechanism and the traction devices from the platform, but this is accomplished from the ground, thus requiring either that the operator descend from the platform to connect and disconnect the steering devices or that some other person be present to do this.

One object of the present invention is to provide means whereby the traction devices may be selectively controlled from a revolving platform; and, further, provide such a mechanism in which the connections will be controlled by the movement of the platform itself.

It is also an object of the invention to provide means for locking the mechanism against rearward movement under the thrust of the excavating mechanism, without interfering with its forward movement under its own power.

Other objects of the invention will appear as the mechanism is described in detail.

In the accompanying drawings Fig. 1 is a side elevation of a portion of a steam shovel showing the invention applied thereto; Fig. 2 is a sectional view through the traction devices and their controlling mechanism, taken longitudinally of the rear axle; Fig. 3 is a top plan view of one of the traction devices with the traction belt partially broken away; Fig. 4 is a side elevation of a driving gear and clutch mechanism; Fig. 5 is a side elevation of the locking plate for the driving gear; Fig. 6 is a sectional detail view of the driving gear; Fig. 7 is a plan view of a manually operated device for shifting the clutch; Fig. 8 is a detail view of the device for locking the mechanism against rearward movement; Fig. 9 is a side elevation of the driving drum for one of the traction devices, Fig. 10 is a detail view showing the detent for the locking pin; and Fig. 11 is a plan view of the same.

In these drawings we have illustrated one embodiment of our invention and have, for the purpose of illustration, shown the same as applied to a revolving steam shovel. As here shown, the machine consists of a base 1 having mounted thereon an annular rack 2 above which is supported a revolving platform 3, which carries the power plant, excavating mechanism and operating devices, and on which the operator stands. The axis of the platform is coincident with the center of the annular rack and the upper surface of the annular rack 2 constitutes a track upon which travels supporting rollers 4 which are interposed between the track and the platform. A pinion 5 carried by the platform meshes with the rack and is driven by the power mechanism mounted on the platform. The rotation of the pinion in mesh with the rack causes the platform to rotate about its axis.

The base 1 is carried by crawling traction devices which may be of any suitable character but, as here shown, comprise rigid frame members 6 mounted near their ends upon axles 7 and 8 mounted in suitable bearings on the base 1. Journaled in the respective ends of each frame 6 are drums 9 and 10 about which extends the traction belt 11, this belt extending about the drums and about the frame 6 and being provided on its inner surface with a track on which travel rollers 12 carried by the frame member 6. The shaft 13 of the drum 9 extends beyond the inner side of the frame member 6 and has rigidly secured thereto a gear 14 by means of which rotatory movement is imparted to the drum and traveling movement imparted to the traction belt. Meshing with the gear 14 is a driving gear 15 which is operatively connected with the axle 7 and this axle is rotated by means of a suitable driving mechanism, which as here shown consists of a beveled gear 16 rigidly secured thereto and meshing with a beveled pinion 17 secured with a shaft 18 which in turn is operatively connected in a well known manner with a shaft arranged axially of the revolving platform and connected with the power mechanism carried by that platform. The mechanism so far described is for the most part of a well known character and forms no part of the present invention, which may be applied to crawling traction mechanisms of various kinds.

In order that the machine may be steered the two traction devices are detachably connected with the driving mechanism, preferably by means of clutches which are separately operable so that either traction device may be disconnected from the driving mechanism independently of the other. In the present construction the clutches for the two traction devices and the operating mechanisms therefor are identical and it will be necessary to describe but one of these mechanisms. The clutch preferably consists of a gear-like member 19 rigidly secured to the axle 7 adjacent to the frame member 6 and having an elongated hub 20 on which the gear 15 is rotatably and slidably mounted. This gear is provided in that side adjacent to the traction device with a recess 21 having clutch teeth 22 and adapted to receive the clutch member 19. Any suitable means may be provided for moving the gear 15 into and out of operative connection with the clutch member 19. As here shown, a clutch shifting device is mounted upon the base and comprises a clutch engaging member, or yoke, 23 carried by a bar 24 slidably mounted in suitable bearings on the base and parallel with the axle 7. The clutch engaging member or yoke 23 is seated in an annular recess 25 extending circumferentially of the gear, so that the longitudinal movement of the bar 24 will impart movement to the movable clutch member in either direction. The clutch shifting device further consists of an arm 26 rigidly secured to the bar 24 and extending upwardly through an opening 27 in the base, so that it will project above the base and form an abutment by means of which longitudinal movement may be imparted to the bar 24. The bar 24 is acted upon by a spring which tends to hold the clutch normally in its operative position. In the present instance a coil spring 28 is interposed between the abutment 26 and a fixed bracket 29 mounted on the base 1. If desired, an adjustable stop 30 may be provided to limit the movement of the abutment by the spring. The movement of the abutment against the tension of the spring 28 and the consequent movement of the clutch member into an inoperative position is preferably accomplished by the movement of the platform 3 about its axis and to this end we have mounted on the platform 3 an actuating device adapted to be moved into and out of alinement with the abutment 26 and which, when in alinement with the abutment, will, when the platform is rotated in one direction engage the abutment and move the same against the tension of the spring. As here shown, this actuating device is in the form of an arm 31 rigidly secured to a shaft 32 journaled in suitable bearings carried by the revolving platform 3. Rocking movement is imparted to the shaft 32 to move the arm 31 into and out of a position in line with the abutment 26 by means of a lever 33 mounted on the platform 3 and connected by means of a rod 34 with a crank arm 35 rigidly secured to the shaft 32. As will be apparent from the drawings, Fig. 2 in particular there is an actuating device, or arm, 31 for the abutment 26 of each clutch shifting device and these arms are both rigidly secured to the shaft 32 and when in their operative positions will both be in line with the respective abutments but out of engagement therewith, the arrangement being such that the rotation of the platform in one direction will cause one clutch to be shifted and the rotation of the platform in the other direction will cause the other clutch to be shifted. During the normal operation of the excavating mechanism the lever 33 is locked in such a position as to hold the actuating arm 31 in elevated positions and out of line with the respective abutments so that the platform is free to rotate.

The excavating mechanism may be operated with the boom at either end of the base 1 and not infrequently a machine of this character will be operated in such a position that the platform can not make a complete half rotation. In order to permit the steering mechanism to be operated under all such conditions, we have provided actuating devices for the abutments 26 at both ends of the platform 3 so that the clutches may be shifted by the platform when the boom is at either end of the base. The actuating devices at the front end of the frame 3 are also in the form of arms, as shown at 36, and are rigidly secured to a rock shaft 37 which is connected by means of a crank arm 38 and a rod 39 with the lever 33. It will be noted that the crank arm 35 extends downwardly from the shaft 32 and that the crank arm 38 extends upwardly from the shaft 37, thus the movement of the lever 33 will cause the actuating devices 31 and 36 to be simultaneously elevated or lowered. The arrangement of the shaft 37 on the platform 3 is such that this shaft can not occupy a position directly above the clutch shifting device. Consequently, the arms 36 when in their operative position are inclined instead of vertical, but otherwise the construction and operation are similar to those of the arms 31.

Means may also be provided for shifting either clutch by hand. To this end we have pivotally mounted on the base 1, adjacent to each abutment 26, a lever 40 having a contact portion 41 adapted to engage the abutment and also having a socket 42 to receive an operating bar 43 by means of which pressure may be applied to the abutment to shift the gears. A pin 44 is adapted to extend through an opening in the lever 40 and to enter recesses 45 in the base 1, thereby locking the lever either in its operative or its inoperative position.

We have also provided means whereby the traction device which has been disconnected from the driving mechanism is positively locked against movement. The gear 14 is of such width that the gear 15 will not be moved entirely out of engagement therewith when that gear is actuated to shift the clutch and we have utilized this connection between the two gears to lock the traction device against movement by a lock applied to the gear 15. The flange 46 which forms the inner wall of the annular channel 25 in the gear 15 has formed therein a series of openings 47 adapted to receive a locking member, or pin, 48 slidably mounted in the base 1 and held normally in its operative position by a spring 49. If one of the openings 47 is in line with the locking pin 48 when the gear is shifted it will enter that opening and will thus lock the gear against rotation. If no opening is in line with the pin the shifting of the gear will cause the pin to be retracted and held in its retracted position until the gear is rotated and one of the openings 47 is brought into line with the pin, when the latter will enter that opening and lock the gear against further movement.

At times, as when the shovel, or other machine, is being towed it is desirable that both clutches should be disengaged and that the clutch member should be free to rotate. The clutches may be disengaged by the manually operated levers 40 and when these levers are locked in their operative positions by the pins 44 the clutches will be held in their disengaged positions. Normally, the pins 48 would engage the clutch members 15 and hold the same against rotation, and in order to release these clutch members we have provided means for locking the pins 48 in their retracted position. As here shown, each pin 48 has a flange, or collar, 56, which limits its outward movement by the spring 49 and in order to lock the pin in its retracted position we have provided a detent, or dog, 57, which is pivotally mounted on the frame at 58 and is adapted to be moved into the space between the collar 56 and the frame when the pin is retracted, thereby holding the pin in its retracted position, and permitting the clutch and the gear associated therewith to rotate.

When a gear driven crawling traction mechanism of this type is used in connection with excavating work or on soft ground much difficulty is experienced due to earth, stones and the like being drawn in between the gears, thereby choking the gears and frequently causing serious damage to the mechanism. We overcome this difficulty by using self cleaning gears, that is, gears in which the body of the gear at the base of the space between the adjacent gear teeth is inclined in opposite directions from the center, as shown at 50 in Fig. 6. With gears of this type the teeth of one gear entering the spaces between the teeth of the other gear will force out any earth or other foreign matter which may be drawn in between the two gears. It has been found in practice that these gears will even crush stones and slag without interfering with the operation of the mechanism.

The thrust of the excavating dipper of a steam shovel has a tendency to force the machine rearwardly, the traction belts yielding to permit of this movement. To overcome this objectionable feature and lock the traction mechanism against movement we have provided a locking device which will engage the drum about which the traction belt extends and lock the same against rearward movement without interfering with the forward movement of the same, thus enabling the machine to be advanced from time to time as the work proceeds, but holding it in all positions against rearward movement. To accomplish this we have formed in the outer face of the drum 9 a series of recesses 51 having their front walls straight and their rear walls inclined, as shown in Fig. 8. Cooperating with the recessed face of the drum is a locking dog, here shown as a plunger 52 slidably mounted in a suitable opening in the frame 6 and acted upon by a spring 53 which tends to hold the same in engagement with the drum so that it will enter the recesses successively as they are brought into line therewith by the forward movement of the drum and when in one of the recesses will hold the drum rigidly against reverse movement. As here shown, the outer portion of the plunger 52 is mounted in a bracket 54 mounted on the frame member 6 and the spring 53 is confined between this bracket and a shoulder on the plunger. When it is desired to release the drum for rearward movement the plunger is drawn out against the tension of the spring and a locking pin 55 inserted in an opening therein on the outer side of the bracket 54, thus holding the plunger out of contact with the drum.

While we have shown and described one embodiment of our invention we wish it to be understood that we do not desire to be limited to the details thereof as various modifications may occur to a person skilled in the art.

Having now fully described our invention what we claim as new and desire to secure by Letters Patent, is:

1. The combination with a base, a platform revolubly mounted on said base, crawling traction devices arranged at the sides of said base, and clutches for connecting said traction devices with driving mechanism, of a device controlled by the movement of said platform to shift a selected one of said clutches, and means operable from said platform for moving said device into and out of its operative position.

2. The combination with a base, a platform revolubly mounted on said base, crawling traction devices arranged at the sides of said base, and clutches for connecting said traction devices with driving mechanism, of devices for shifting said clutches, each of said devices comprising an abutment, and actuating devices carried by said platform and movable into and out of alinement with the respective abutments.

3. The combination with a base, a platform revolubly mounted on said base, crawling traction devices arranged at the sides of said base, and clutches for connecting said traction devices with driving mechanism, of devices for shifting said clutches, each of said devices comprising an abutment, actuating devices carried by said platform and movable into and out of alinement with the respective abutments, and means mounted on said platform for moving said actuating devices into and out of alinement with the respective abutments.

4. The combination with a base, a platform revolubly mounted on said base, crawling traction devices arranged at the sides of said base, and clutches for connecting said traction devices with driving mechanism, of devices for shifting said clutches, each of said devices comprising an abutment, a rock shaft mounted on said platform, arms secured to said rock shaft and adapted to be moved thereby into and out of positions in line with the respective abutments, and means mounted on said platform for actuating said rock shaft.

5. The combination with a base, a platform revolubly mounted on said base, crawling traction devices arranged at the sides of said base, and clutches for connecting said traction devices with driving mechanism, of a shifting device for each of said clutches comprising a bar mounted for longitudinal movement and having operative connection with the movable member of the clutch, an abutment rigidly secured to said bar, a spring acting on said abutment to hold said clutch member normally in its operative position, and a part carried by said platform and arranged to engage said abutment and move said movable clutch member into its inoperative position when said platform is rotated in one direction.

6. The combination with a base, a platform revolubly mounted on said base, crawling traction devices arranged at the sides of said base, and clutches for connecting said traction devices with driving mechanism, of a device to shift each of said clutches, and actuating devices mounted at each end of said platform and adapted to be brought into operative relation with said clutch shifting devices.

7. The combination with a base, a platform revolubly mounted on said base, crawling traction devices arranged at the sides of said base, and clutches for connecting said traction devices with driving mechanism, of a device for shifting each of said clutches, each of said devices comprising an abutment, a pair of actuating arms mounted at each end of said platform and adapted to be brought into cooperative relation with the respective abutments.

8. The combination with a base, a platform revolubly mounted on said base, crawling traction devices arranged at the sides of said base, and clutches for connecting said traction devices with driving mechanism, of a device for shifting each of said clutches, each of said devices comprising an abutment, a pair of actuating arms mounted at each end of said platform and adapted to be brought into cooperative relation with the respective abutments, and a lever mounted on said platform and operatively connected with both pairs of actuating arms.

9. The combination with a base, a platform revolubly mounted on said base, crawling traction devices arranged at the sides of said base, and a gear connected with each of said traction devices, of a driving gear permanently in mesh with the first mentioned gear and having sliding movement relatively thereto, a clutch member carried by said sliding gear, a fixed clutch cooperating with the first mentioned clutch member to connect said traction devices with driving mechanism, means for actuating said driving gear to move its clutch member into and out of an operative position, and means to automatically lock said gear against rotation when said clutch member is in its inoperative position.

10. The combination with a base, a platform revolubly mounted on said base, crawling traction devices arranged at the sides of said base, and a gear connected with each of said traction devices, of a driving gear permanently in mesh with the first mentioned gear and having sliding movement relatively thereto, a clutch member carried by said sliding gear, a fixed clutch cooperating with the first mentioned clutch member to connect said traction device with driving mechanism, means controlled by said platform to impart sliding movement to said gear, and a locking member mounted on a fixed support and adapted to engage said gear when said clutch member has been moved into its inoperative position.

11. The combination with a base, a platform revolubly mounted on said base, and crawling traction devices arranged at the sides of said base, of driving mechanism for each of said traction devices comprising permanently meshing gears, one of which is capable of sliding movement relatively to the other, said sliding gear having a part provided with a series of openings arranged concentrically thereof, and a locking pin yieldably mounted on a fixed support, adapted to enter one of said openings when said gear has been moved in one direction.

12. The combination with a base, a platform revolubly mounted on said base, and crawling traction devices arranged at the sides of said base, of driving mechanism for each of said traction devices comprising permanently meshing gears, one of which is capable of sliding movement relatively to the other, said sliding gear having a part provided with openings, and a locking member mounted on a fixed support and adapted to enter one of said openings when said gear has been moved in one direction.

13. The combination with a base, a platform revolubly mounted on said base, crawling traction devices arranged at the sides of said base, and clutches for connecting said traction devices with driving mechanism, of devices for shifting said clutches, each of said devices comprising an abutment, and actuating devices carried by said platform and movable into and out of alinement with the respective abutments, levers pivotally mounted on said base adjacent to the respective abutments and having parts adapted to engage said abutments to actuate said shifting devices.

14. The combination with a base, a platform revolubly mounted on said base, crawling traction devices arranged at the sides of said base, and clutches for connecting said traction devices with driving mechanism, of devices for shifting said clutches, each of said devices comprising an abutment, and actuating devices carried by said platform and movable into and out of alinement with the respective abutments, lever pivotally mounted on said base adjacent to the respective abutments and having parts adapted to engage said abutments to actuate said shifting devices, and means for securing said lever in its operative position.

15. The combination with a base, a platform revolubly mounted on said base, crawling traction devices arranged at the sides of said base, a gear connected with each of said traction devices, of a driving gear permanently in mesh with the first mentioned gear and having sliding movement relatively thereof, a clutch member carried by said sliding gear, a fixed clutch cooperating with the first mentioned clutch member to connect said traction devices with driving mechanism, means for actuating said driving gear to move its clutch member into and out of an operative position, means to automatically lock said gear against rotation when said clutch member is in its inoperative position, and means to render said locking means inoperative.

16. The combination with a base, a platform revolubly mounted on said base, and crawling traction devices arranged at the sides of said base, of driving mechanism for each of said traction devices comprising permanently meshing gears, one of which is capable of sliding movement relatively to the other, said sliding gear having a part provided with a series of openings arranged concentrically thereof, a locking pin yieldably mounted on a fixed support, adapted to enter one of said openings when said gear has been moved in one direction, and a detent to hold said locking pin in an inoperative position.

17. In a mechanism of the character described, a frame, a structure revolubly mounted on said frame, traction devices arranged at the sides of said frame, clutches for connecting said traction devices with driving mechanism, separate shifting devices for each of said clutches, means carried by said structure for selectively operating said shifting devices, and means mounted on said revoluble structure for moving the first mentioned means into and out of operative relation to said shifting devices.

18. In a mechanism of the character described, a frame, a structure revolubly mounted on said frame, traction devices arranged at the sides of said frame, clutches for connecting said traction devices with driving mechanism, separate shifting devices for each of said clutches, parts carried by said revoluble structure and so arranged that the movement of said structure in one direction will cause one of said parts to actuate one of said clutch shifting devices and the movement of said structure in the other direction will cause the other of said parts to actuate the other of said clutch shifting devices, and means mounted on said structure to move said parts into and out of operative relation to said clutch shifting devices.

In testimony whereof we affix our signatures hereto.

BENJAMIN JACOBY.
DWIGHT J. SHELTON.
BERLIN S. FERGUSON.
FRANCIS JENNINGS.